United States Patent [19]

Naruse et al.

[11] Patent Number: 4,637,721
[45] Date of Patent: Jan. 20, 1987

[54] LIGHT MEASURING DEVICE

[75] Inventors: Kazuhiko Naruse, Nabari; Yoshio Yuasa, Osaka, both of Japan

[73] Assignee: Minolta Camera Kabushiki Kaisha, Osaka, Japan

[21] Appl. No.: 580,116

[22] Filed: Feb. 14, 1984

[30] Foreign Application Priority Data

Feb. 16, 1983 [JP] Japan .............................. 58-22172[U]

[51] Int. Cl.$^4$ .............................................. G01J 1/46
[52] U.S. Cl. ..................................... 356/215; 356/218
[58] Field of Search ............... 356/215, 218, 221, 226, 356/227; 354/145.1, 412, 415, 419, 424

[56] References Cited

U.S. PATENT DOCUMENTS 4,203,668  5/1980  Chapman ............................. 356/215
4,227,808 10/1980  Yuasa ................................. 356/218

Primary Examiner—Davis L. Willis
Attorney, Agent, or Firm—Price, Gess & Ubell

[57] ABSTRACT

An improved light measuring device that is capable of measuring light upon initialization from either a flash of light or a manual switch is provided. A sensor assembly can produce a light intensity signal and a change in the intensity of the light measured can be used to produce a first signal. A second signal can be produced by a manually operable member. A counter can be used to count the number of signals and to produce a preparing signal upon an initial signal counted and a start signal upon a subsequent signal counted. Measurement of the amount of light in the circuit can be initially enabled when the counting means counts the first signal and the actual light measurement can be started subsequently upon the counting means initiating a start signal. Various sequences of producing the pair of signals can be utilized to control the operation of the light measuring device.

15 Claims, 3 Drawing Figures

LIGHT MEASURING DEVICE

BACKGROUND OF THE INVENTION

1. Field of the Invention

This invention relates to a light measuring device switchable to a photo trigger mode in which light measurement is started in response to receiving a flash light from a flash device for measuring the flash light, and to a code trigger mode in which light measurement is started in response to a manual operation for measuring natural light.

2. Description of the Prior Art

Light measuring devices as described above that can be switched either to a photo trigger mode or a code trigger mode are known. For example, in U.S. Pat. No. 4,227,808 filed by the same assignee as that of this application, a light measuring device is disclosed with reference to its FIG. 3 as an embodiment. The light measuring device includes a manually operated mode selector for selecting either a photo trigger mode or a code trigger mode, and a switch manually operable for starting the light measurement when the code trigger mode was selected by the mode selector.

When the photo trigger mode is selected by the mode selector, the light measuring device mentioned above first starts the light measuring if upon receipt of a pulse light by a photodetector. Under this mode the light measurement will not be started even if the above mentioned switch is manually closed.

Conversely, if the code trigger mode is selected by the mode selector, the light measurement will be started by the closure of the switch. However, under this code trigger mode, the light measuring will not start even if a pulse light impinges upon the photodetector before the closure of the above switch. Consequently, the photo trigger mode is normally used for measuring the flash light while the code trigger mode is used for measuring the natural light.

However, this device requires two manually operating members, i.e., a mode selector and a manually operable switch, so that it is complicated in construction and not convenient for operating because it requires two operations, that is, switching of the mode selector and then closing of the manually operable switch when the light measurement is to be started after switching from the photo trigger mode to the code trigger mode.

SUMMARY OF THE INVENTION

An object of the present invention is to provide a light measuring device that is simple in construction and is improved in operation as compared with the above mentioned prior art light measuring devices.

Another object of the present invention is to provide a light measuring device capable of light measurement in both the photo trigger mode and code trigger mode by the operation of a single manually operated member.

In order to attain the above objects, the light measuring device according to the present invention is characterized in that a signal will be generated either when a sudden change occurs in the light intensity incident on the photodetector or when the single manually operating member is operated, and that the first signal is effective for making a waiting state where both the photo trigger mode and code trigger mode are ready to be started and the next signal initiates the light measurement.

DETAILED DESCRIPTION OF THE PREFERRED EMBODIMENTS

Referring to the figures, the preferred embodiments of the present invention will be explained in detail.

Figure 1:
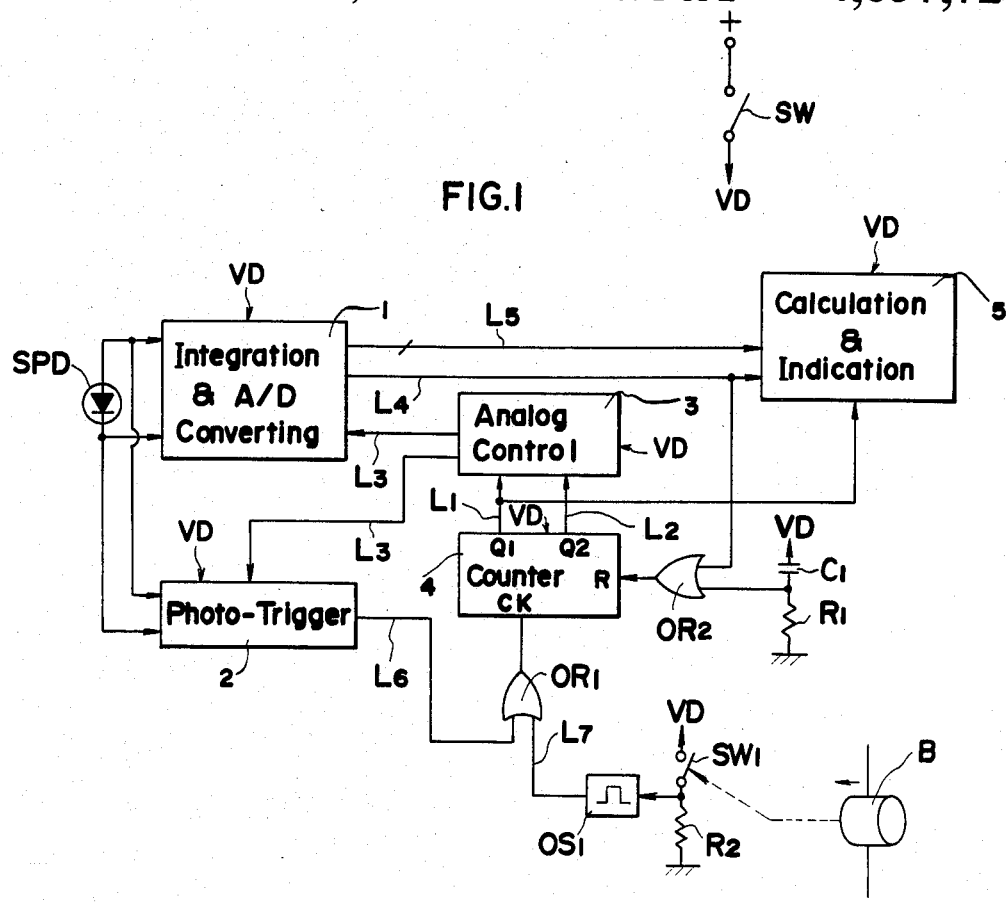
FIG. 1 is a block diagram showing a preferred embodiment of a light measuring device according to the present invention.

FIG. 1 is a block diagram showing the construction of the first preferred embodiment of the present invention. The construction of the embodiment will be explained hereinafter together with its operations. First, when the power supply switch SW is turned "ON", a voltage is supplied to a terminal VD in the Figure and a pulse is generated by capacitor C1 and resistance R1 at the node therebetween. This pulse is applied to reset terminal R of binary counter 4 via OR circuit OR2, thereby, clearing the contents of the counter 4. Under this state, both output terminals Q1 and Q2 of counter 4 remain at a LOW level.

In accordance with the output conditions of the two output terminals Q1 and Q2 of counter 4 mentioned above, analog control circuit 3 controls through line L3 the operation of integrating and A/D converting circuit 1A which integrates the amount of electric output from photodetector SPD and which converts the analog representing the integrated amount into a digital quantity. Analog control circuit 3 also controls through line L3 the operating conditions of the photo trigger circuit 2 which generates a one-shot pulse output when it detects that photodetector SPD receives flash light. As described above, when both output terminals Q1 and Q2 of counter C4 remain at LOW levels, analog control circuit 3 interrupts power supply to integrating and A/D converting circuit C1 and photo trigger circuit 2, thereby rendering both circuits 1 and 2 inoperative.

Switch SW1 closes in response to depression of manually operated button B. When switch SW1 is opened after being closed, with button B being released after being depressed, the one-shot circuit OS1 generates a one-shot pulse. This one shot-pulse is applied to input terminal CK of counter 4 via OR circuit OR1, thereby turning only output terminal Q1 of counter 4 to a high level with output terminal Q2 remaining at a low level. With the high level of output terminal Q1, analog control circuit 3 effects power supply to both integrating and A/D converting circuit 1 and photo trigger circuit 2, thereby activating both circuits. Further, output terminal Q1 of counter 4 is connected to the calculation and display circuit 5 which performs the calculation of a light measurement signal and displays its result. And when the above output terminal Q1 turns to a high level, calculation and display circuit 5 also displays that integrating and A/D converting circuit C1 and photo trigger circuit 2 are ready to operate. This status expresses the condition that the system is in a standby mode waiting for flash light under the photo trigger mode and at the same time, as described later, the system is also in a standby mode waiting for an instruction to start light measurement when the code trigger mode is selected. Hereinafter this condition is referred to as "WAIT" status.

First, the operations of the photo trigger mode are described. When the flash light impinges upon photodetector SPD under the "WAIT" status, the above photo trigger circuit 2 generates a one-shot pulse which is transmitted through line L6 to input terminal CK of aforementioned counter 4 via OR circuit OR1. Consequently, counter 4 inverts its output terminal Q1 and Q2 to a LOW level and HIGH level, respectively. When output terminals Q1 and Q2 of counter 4 become LOW and HIGH, the above control circuit 3 transmits an instruction signal via line L3 to integrating and A/D converting circuit 1 for integrating the output current of photodetector SPD commensurate with the light incident upon the photodetector SPD. The above integrating and A/D converting circuit 1 performs integration for a designated period of time upon receipt of this instruction signal, and thereafter performs an A/D conversion of the integrated voltage. The A/D converted data generated are transmitted to calculation and display circuit 5 via line L5.

Integrating and A/D converting circuit 1 transmits the A/D converted data of the integrated voltage to calculation and display circuit 5 via line L5, simultaneously transmitting via line L4 an A/D conversion completion pulse indicating the completion of A/D conversion. Upon receipt of the above A/D conversion completion pulse, calculation and display circuit 5 calculates a light measurement value by taking in A/D converted data from line L5 and displays the results. Also, the A/D conversion completion pulse is delivered to reset terminal R of counter 4 via OR circuit OR2 thereby resetting both output terminals Q1 and Q2 of counter 4 to the initial state of LOW levels.

Next, the operations of the code trigger mode are described. Under the "WAIT" status with output terminals Q1 and Q2 of counter 4 being at a HIGH level and a LOW level respectively, if the above manual operation button B is released after being depressed again, i.e., if switch SW1 is opened after being closed, a one-shot circuit OS1 again generates a one-shot pulse. Since this one shot-pulse enters input terminal CK via OR circuit OR1, output terminals Q1 and Q2 of counter 4 turn to LOW and HIGH levels respectively in the same manner as in the previously described case when counter 4 receives the one-shot pulse from photo trigger circuit 2.

Consequently as previously described, the analog control circuit 3 transmits the instruction signal to integrating and A/D conversion circuit 1 thereby performing integration of light measurement signal and A/D conversion. The operations hereafter are the same as that in the optical trigger mode and their explanation is omitted.

With the previously described prior art devices, if no flash light is incident upon the photodetector under the photo trigger mode, the measuring button had to be depressed for starting any light measuring after the mode setting means is switched to the code trigger mode. Whereas in the present embodiment, a single operation of a single light measurement button attains the "WAIT" status in which either the photo trigger and code trigger mode are possible. Since the code trigger mode is effected by depressing said button again, it is only necessary to redepress the measuring button B which has been depressed to make the above "WAIT" status even when there is no incident flash light. As described in the foregoing, the advantage of the present invention is that the number of operating members can be reduced compared with that of the conventional devices resulting in a simple construction and improved operational convenience.

Figure 2:
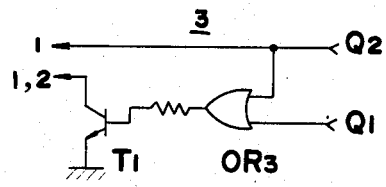
FIG. 2 is a diagram of an electric circuit showing the composition of its analog control circuit.

FIG. 2 shows a concrete composition of an analog control circuit 3. When either terminal Q1 or Q2 is rendered to be of HIGH levels, the output of OR circuit OR3 becomes a HIGH level whereby transistor T1 is rendered conductive and power is supplied to both integrating and A/D converting circuit 1 and photo trigger circuit 3. And then, a high level signal of terminal Q2 is transmitted to integration and A/D converting circuit 1 as a previously described instruction signal.

Figure 3:
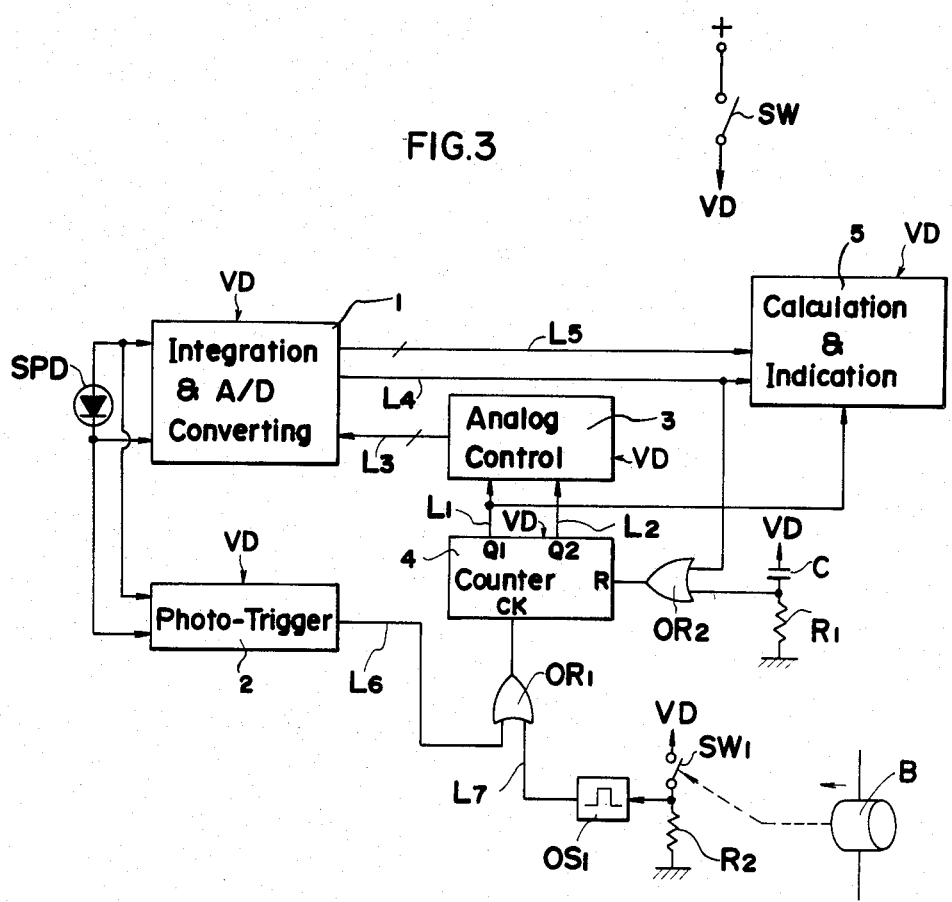
FIG. 3 is a block diagram showing another preferred embodiment of the light measuring device.

FIG. 3 is a block diagram showing a second embodiment according to the present invention, and the same reference characters as those of the first embodiment are given to the components whose functions are the same as that of the first embodiment and their detailed explanation is omitted. Photo trigger circuit 2 in FIG. 1 received a power supply only at the "WAIT" status by the control of analog control circuit 3, whereas photo trigger circuit 2 of the second embodiment in FIG. 3 always receives a power supply while the power supply to the device is turned "ON". Accordingly, in the first embodiment, light measuring starts only when a flash light is incident upon photodetector SPD after measuring button B is once depressed rendering the device to be in the "WAIT" status. Conversely, in the second embodiment, since the photo trigger circuit 2 is always ready to operate, it is possible to place the integrating and A/D converting circuit 1 to the "WAIT" status by making a flash light impinge upon photodetector SPD without the operating measuring button B. Thereafter, light measurement starts in response to flash light incident upon photodetector SPD again, or to the depression of the measuring button B, and the measured results are displayed by calculation and display circuit 5 as well as in the case of the first embodiment. Thus, the second embodiment permits the starting of light measuring without the measuring button of the device being touched at all, and the user can effect light measuring even when he or she is remote from the device. Also, in this embodiment, it is possible to start light measuring by depressing the measuring button after rendering the device to be in the "WAIT" status by a flash light. In other words, this embodiment permits usages in the following four ways:

1. After rendering the device to be in the "WAIT" status by means of a flash light, light measuring can be started by using the flash light again.

2. After rendering the device to be in the "WAIT" status by means of a flash light, light measuring can be started by depressing the measuring button.

3. After rendering the device to be in the "WAIT" status by depressing the measuring button, light measuring can be started by means of a flash light.

4. After rendering the device to be in the "WAIT" status by the measuring button, light measuring can be started by redepressing the measuring button.

In the case of the above item 1, the device need not require a manual operation thereof, items 2 and 3 requires only the depression of the measuring button once and item 4 requires the operator to depress the measuring buttong twice. Accordingly, a device employing the present invention can be simplified in structure as compared with conventional devices requiring two operating members. Additionally, according to the invention convenience of operation is enhanced since two different operating members are not required to be operated in any of the cases mentioned above.

It should be noted that in the case of this second embodiment the construction of analog circuit 3 is the same as that of FIG. 2 except of the point that the output terminal shown at the lower part in FIG. 2 controlled by the output of OR circuit OR3 need not be connected with photo trigger circuit 2.

Also, in both embodiments mentioned above, the systems are designed such that the power supply to integrating and A/D converting circuit 1 starts by rendering output terminal Q1 of counter 4 at a high level to make the system ready to transmit the measuring signals in response to the measured results. Whereas the present invention is not necessarily limited to such design, but for example, the systems can be alternatively designed such that power is supplied to integrating and A/D converting circuit 1 in advance and that a gate circuit is provided at its output so that the light measuring signals can be delivered whenever this gate circuit is unlocked by the HIGH level output from terminal Q1 of the above counter 4. With the constructing of a device so far described, light measuring under the code trigger mode can be started by operating the single operating member twice, thus affording superior operational convenience over the conventional code trigger mode which requires two operating members.

Moreover if the device is constructed as described with reference to the second embodiment such that the photo trigger circuit 2 can be ready to operate upon turning power "ON" to the device, the light measuring can be started with activation of flash light twice thus making it possible to perform remote control of the light measuring device. In addition, if the "WAIT" state is first produced by a flash light then, light measuring can be started by operating the operational button.

What is claimed is:

1. A light measuring device having an electrical power supply and capable of starting its light measuring operation in response to receiving flash light from a flash device and also to activation of a manual operation, comprising:
   light receiving means for receiving light to be measured to produce a light intensity signal representative of the intensity of the light received thereby;
   detecting means for detecting any change of the light intensity signal to produce a first signal each time a change is detected;
   signal producing means, including a manually operable member, for producing a second signal each time said manually operable member is operated;
   measuring means for measuring the amount of light received by the light receiving means for a predetermined time period in accordance with said light intensity signal to produce a light measuring signal representative of the amount measured by said measuring means;
   controlling means for controlling said measuring means in accordance with said first and second signals to enable the electrical power supply to said measuring means upon a first receipt of either of said first and second signals, and to start operation of said measuring means upon a second receipt of either of said first and second signals; and
   indicating means for indicating a light measuring value in accordance with said light measuring signal.

2. A light measuring device as claimed in claim 1, wherein said controlling means includes:
   counting means for counting the number of either of said first and second signals to produce a preparing signal upon first receipt of a signal and to produce a starting signal upon second receipt of a signal; and
   starting means for starting a supply of electrical power to said measuring means upon receipt of said preparing signal, and for starting an operation of said measuring means upon receipt of said starting signal.

3. A light measuring device as claimed in claim 2, wherein said measuring means includes means for producing a completing signal when operation of said measuring means is completed, and wherein said counting means is cleared to clear the number counted by said counting means in response to said completing signal.

4. A light measuring device as claimed claim 3, wherein said measuring means includes:
   integrating means for integrating the amount of light received by said receiving means for a predetermined time period to produce an integrating signal representative of the amount of light integrated by said integrating means; and
   converting means for converting said integrating signal into a corresponding digital signal, said converting signal producing said completing signal when the operation of said converting means is completed.

5. A light measuring device as claimed in claim 2, further comprising a main switch and a clear signal producing means for producing a clear signal in response to closure of the main switch of said device, and wherein said counting means is cleared of the number counted by said counting means in response to said completing signal.

6. A light measuring device as claimed in claim 2, further comprising displaying means for displaying indicia indicating that the preparation of a light measuring operation of said measuring means has been completed in response to said preparing signal.

7. A light measuring device as claimed in claim 2, wherein said detecting means is supplied with electrical power in response to said preparing signal.

8. A light measuring device as claimed in claim 1, wherein said manually operable member is an operable button manually depressible, and wherein said signal producing means produces the second signal in response to depression of said operable button.

9. An improved light measuring device comprising:
   a light intensity signal producing means for producing a light intensity signal from incident light;
   electrical power providing means for providing electrical power:
   light intensity signal processing means for processing the light intensity signal to measure the amount of light over a predetermined time period and producing a signal indicative of the light measured; and
   controller means for starting the operation of said light intensity signal processing means including a manual switch member for producing a first signal and a light measuring circuit for producing a second signal from a light signal, said controller means starting said light intensity signal procesing means in response to a sequence of at least one of the following:

(a) a detection of a light signal and subsequent activation of the manual switch member,
(b) a detection of a series of two light signals,
(c) an activation of the manual switch member twice, and
(d) an activation of the manual switch member and a subsequent detection of the light signal, wherein an initial signal generated by the controller means from either of the first and second signals will provide electrical power to said light intensity signal processing means and a subsequent signal of either of the first and second signals will start operation of said light intensity signal processing means.

10. The invention of claim 9, where the controller means includes:
    counting means for counting the number of either the first and second signals to produce an initial signal upon first receipt thereof, and to produce a starting signal upon subsequent receipt of either of the first and second signals; and
    initiating means for initiating the electrical power supply to said light intensity signal producing means upon receipt of the initial signal and for starting operation of said light intensity signal processing means upon receipt of the starting signal.

11. The invention of claim 10, wherein said light intensity signal processing means includes a completing signal producing means for producing a completing signal when the operation of said light intensity signal processing means is completed, and wherein said counting means is cleared to clear the number counted by said counting means in response to the completing signal.

12. The invention of claim 11, wherein said light intensity signal processing means includes:
    integrating means for integrating the amount of light received by said light intensity signal producing means for a predetermined time period to produce an integrating signal representative of the amount of light integrated by said integrating means; and
    converting means for converting the integration signal into a corresponding digital signal, the converting means producing the completing signal when operation of said converting means is completed.

13. The invention of claim 12, further comprising displaying means for displaying indicia indicating that the operation of said light intensity signal processing means has been completed in response to the completing means.

14. An improved light measuring device comprising:
    a sensor assembly for receiving light to be measured to produce a light intensity signal representative of intensity of light received thereby;
    detecting means for detecting any change in said light intensity signal to produce a first signal each time a change is detected;
    signal producing means, including a manually operable switch member, for producing a second signal each time the manual operable switch member is operated;
    counting means for counting the number of both of the first and second signals and producing a preparing signal upon a first count of said counting means and a start signal upon a second count of said counting means;
    measuring means for measuring the amount of light received by the sensor assembly for a predetermined time period to produce a light measuring signal representative of the amount measured by said measuring means;
    controlling means for controlling said measuring means in accordance with the preparing signal and the start signal, both of which are produced by said counting means so that said measuring means is initially energized upon receipt of the preparing signal and subsequently activated to start operation of said measuring means upon receipt of the start signal; and
    indicating means for indicating the amount of light measured by said measuring means in accordance with said light measuring signal.

15. The invention of claim 14, wherein said controlling means enables an operation of said measuring means with the preparing signal and starts an operation of said measuring means upon responding to a sequence of at least one of the following:
    (a) a production of a first signal and a subsequent production of a second signal;
    (b) a production of a series of two first signals;
    (c) a production of series of two second signals; and
    (d) a production of a second signal and a subsequent production of a first signal.

* * * * *